(No Model.)

E. M. AMES.
WARMING PAN.

No. 266,069.

Patented Oct. 17, 1882.

WITNESSES:
Theo. G. Hoster
C. Sedgwick

INVENTOR:
E. M. Ames
BY Munn & Co
ATTORNEYS.

UNITED STATES PATENT OFFICE.

ELIJAH M. AMES, OF PEPPERELL, MASSACHUSETTS.

WARMING-PAN.

SPECIFICATION forming part of Letters Patent No. 266,069, dated October 17, 1882.

Application filed May 18, 1882. (No model.)

*To all whom it may concern:*

Be it known that I, ELIJAH M. AMES, of Pepperell, in the county of Middlesex and State of Massachusetts, have invented a new and Improved Warming-Pan, of which the following is a full, clear, and exact description.

The object of my invention is to provide a new and improved warming-pan for warming beds.

The invention consists of a flat hollow vessel having its edges beveled from the top and bottom, which vessel is provided with a tubular handle open at both ends, through which handle the steam of the hot water with which the vessel is filled can escape, whereby all moisture is kept out of the bed. As the edges of the vessel are beveled, it can be passed under the covers or sheets without wrinkling or folding them.

Reference is to be had to the accompanying drawings, forming part of this specification, in which similar letters of reference indicate corresponding parts in both the figures.

Figure 1:
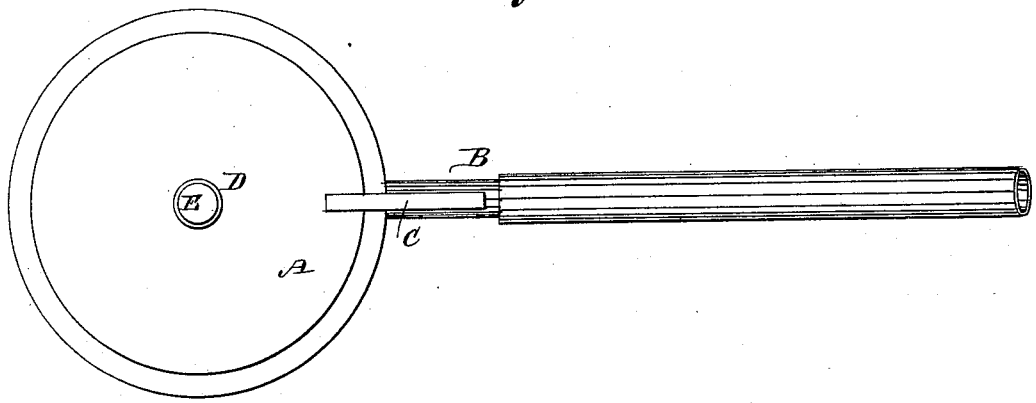
Figure 2:
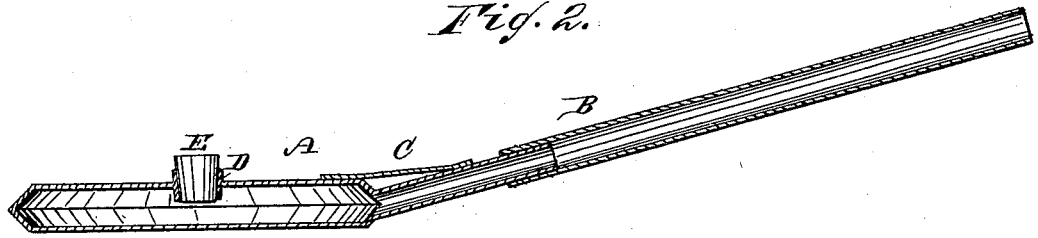

Figure 1 is a plan view of my improved warming-pan. Fig. 2 is a longitudinal sectional elevation of the same.

A flat hollow vessel, A, preferably made of sheet metal, has its edges beveled from the top and bottom, and is provided with a hollow handle, B, projecting from the edge, which handle may be made in one or two sections, so that its length may be varied as the circumstances may require. The handle is braced and strengthened by means of a strip or band, C, secured on the pan and on the handle. The pan is provided in its upper surface with an aperture surrounded by a collar, D, into which a plug or stopper, E, fits. The pan can be made any desired and suitable size.

To use the pan, the same is filled with hot water, and the plug E is firmly inserted in the collar D, and then the pan is passed in under the bed-covers and remains for a short time on the place to be warmed, or is passed over the sheets in various directions for a few minutes, if the entire bed is to be warmed. The steam of the hot water in the pan passes off through the hollow handle, whereby dampness will be kept out of the bed. As the pan is provided with a beveled edge, it can be passed under the covers and sheets without folding or wrinkling them.

Having thus fully described my invention, I claim as new and desire to secure by Letters Patent—

A bed-warmer consisting of the flat hollow pan or vessel A, having its edges beveled upon their upper and lower surfaces and provided with a plugged filling, opening D, and of the handle-tube B, open at both ends and affixed to the vessel or pan A, substantially as herein shown and described, and for the purpose set forth.

ELIJAH M. AMES.

Witnesses:
   LORENZO P. BLOOD,
   SARAH W. THOMPSON.